(12) United States Patent
Suzuki

(10) Patent No.: US 9,301,294 B2
(45) Date of Patent: *Mar. 29, 2016

(54) WIRELESS COMMUNICATION SYSTEM, WIRELESS TRANSMITTING APPARATUS, WIRELESS RECEIVING APPARATUS, WIRELESS TRANSMISSION METHOD, AND WIRELESS RECEPTION METHOD

(71) Applicant: SHARP KABUSHIKI KAISHA, Osaka-shi, Osaka (JP)

(72) Inventor: Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,960

(22) Filed: Apr. 6, 2015

(65) Prior Publication Data

US 2015/0215917 A1    Jul. 30, 2015

Related U.S. Application Data

(60) Continuation of application No. 14/251,352, filed on Apr. 11, 2014, now Pat. No. 9,036,559, which is a division of application No. 13/139,690, filed as application No. PCT/JP2009/070453 on Dec. 7, 2009, now Pat. No. 8,737,364.

(30) Foreign Application Priority Data

Dec. 15, 2008   (JP) .................................. 2008-318929

(51) Int. Cl.
*H04W 72/04*  (2009.01)
*H04W 48/12*  (2009.01)
(Continued)

(52) U.S. Cl.
CPC ............. *H04W 72/042* (2013.01); *H04L 5/001* (2013.01); *H04L 5/0053* (2013.01);
(Continued)

(58) Field of Classification Search
CPC . H04W 52/262; H04W 72/04; H04W 72/042; H04W 72/0446; H04W 72/0453; H04W 48/12; H04W 88/02; H04W 88/08; H04L 5/001; H04L 5/0023; H04L 5/0048; H04L 5/0053; H04L 5/0091; H04L 5/0092; H04L 1/0059; H04L 1/0066; H04L 2001/0093
See application file for complete search history.

(56) References Cited

U.S. PATENT DOCUMENTS 9,036,559 B2    5/2015  Suzuki
2008/0101440 A1*  5/2008  Lee ............................... 375/141
(Continued)

FOREIGN PATENT DOCUMENTS

JP    4961044 B2    6/2012
JP    5747285 B2    7/2015

OTHER PUBLICATIONS

3GPP, "Technical Specification Group Radio Access Network; Evolved Universal Terrestrial Radio Access (E-UTRA); Physical Channels and Modulation (Release 8)", 3GPP TS 36.211 V8.4.0 (Sep. 2008), pp. 1-78.
Huawei, "CCE to RE Interleaver Design Criteria", 3GPP TSG-RAN-WG1 Meeting #49bis, 5.13.1, R1-072904, Orlando, FL, USA, Jun. 25-29, 2007.
International Search Report issued in International Application No. PCT/JP2009/070453 on Mar. 9, 2010.
(Continued)

*Primary Examiner* — Jianye Wu
(74) *Attorney, Agent, or Firm* — Birch, Stewart, Kolasch & Birch, LLP

(57) ABSTRACT

A mobile station device that includes a receiving unit. The receiving unit of mobile station device receives using at least a first downlink component carrier and a second downlink component carrier which are aggregated, the receiving unit is configured to receive, a first physical downlink control channel for the mobile station device, on the first downlink component carrier, and a second physical downlink control channel for the mobile station device, on the second downlink component carrier, where both a first sequence including at least modulated symbols of the first physical downlink control channel and a second sequence including at least modulated symbols of the second physical downlink control channel are cyclically-shifted by a base station.

6 Claims, 15 Drawing Sheets

(51) Int. Cl.
  *H04W 88/02* (2009.01)
  *H04W 88/08* (2009.01)
  *H04L 5/00* (2006.01)
  *H04L 1/00* (2006.01)

(52) U.S. Cl.
  CPC ............ *H04L 5/0091* (2013.01); *H04W 48/12* (2013.01); *H04W 72/0446* (2013.01); *H04W 72/0453* (2013.01); *H04L 1/0059* (2013.01); *H04L 1/0066* (2013.01); *H04L 5/0023* (2013.01); *H04L 5/0048* (2013.01); *H04L 5/0092* (2013.01); *H04L 2001/0093* (2013.01); *H04W 88/02* (2013.01); *H04W 88/08* (2013.01)

(56) References Cited

U.S. PATENT DOCUMENTS

| | | | |
|---|---|---|---|
| 2010/0067464 A1* | 3/2010 | Higuchi | 370/329 |
| 2010/0118773 A1* | 5/2010 | Kawamura et al. | 370/328 |
| 2011/0299508 A1 | 12/2011 | Suzuki | |
| 2012/0289278 A1 | 11/2012 | Huschke et al. | |

OTHER PUBLICATIONS

Nokia, Nokia Siemens Networks, "Transport Block Mapping and DL Control Signalling in LTE-Advanced", 3GPP TSG-RAN WG1 Meeting #55, R1-084315, Prague, Czech Republic, Nov. 10-14, 2008, 5 pages.

NTT Docomo, "DL Layered Control Signal Structure in LTE-Advanced", 3GPP TSG RAN WG1 Meeting #55, R1-084248, Nov. 10-14, 2008, Prague, Czech Republic, pp. 1-7.

Texas Instruments, "Issues on Carrier Aggregation for Advanced E-UTRA", 3GPP TSG RAN WG1 #55, R1-084443, Nov. 10-14, 2008, Prague, Czech Republic, pp. 1-5.

U.S. Notice of Allowance issued in U.S. Appl. No. 13/139,690 on Jan. 13, 2014.

U.S. Notice of Allowance issued in U.S. Appl. No. 14/251,352 on Jan. 7, 2015.

U.S. Office Action issued in U.S. Appl. No. 13/139,690 on Sep. 17, 2013.

U.S. Office Action issued in U.S. Appl. No. 14/251,352 on Sep. 11, 2014.

* cited by examiner

WIRELESS COMMUNICATION SYSTEM, WIRELESS TRANSMITTING APPARATUS, WIRELESS RECEIVING APPARATUS, WIRELESS TRANSMISSION METHOD, AND WIRELESS RECEPTION METHOD

This application is a Continuation of co-pending application Ser. No. 14/251,352, filed on Apr. 11, 2014, which is a Divisional of application Ser. No. 13/139,690 filed on Aug. 18, 2011 (issued as U.S. Pat. No. 8,737,364 on May 27, 2014), and for which priority is claimed under 35 U.S.C. §120, application Ser. No. 13/139,690 is the national phase of PCT International Application No. PCT/JP2009/070453 filed on Dec. 7, 2009 under 35 U.S.C. §371, which claims the benefit of priority of JP2008-318929 filed Dec. 15, 2008. The entire contents of each of the above-identified applications are hereby incorporated by reference.

TECHNICAL FIELD

The present invention relates to a technique in which a wireless transmitting apparatus performs radio transmission to a plurality of wireless receiving apparatuses by assigning one or more component carriers to a downlink.

BACKGROUND ART

The 3rd generation (hereinafter, referred to as "3G") Evolved Universal Terrestrial Radio Access (hereinafter, referred to as "EUTRA" or "LTE") and the 3G EUTRA network (Evolved Universal Terrestrial Radio Access Network), of cellular mobile communication have been conventionally studied in 3GPP (3rd Generation Partnership Project).

Further, the study of the 4th generation (hereinafter, referred to as "4G") radio access (Advanced EUTRA: hereinafter, referred to as "A-EUTRA" or "LTE-A") and the 4G network (Advanced EUTRAN), of cellular mobile communication have been started in 3GPP. In A-EUTRA, supporting wider band than EUTRA, and compatibility with EUTRA are studied, and it is proposed that a base station device for A-EUTRA communicates with a mobile station device for EUTRA in all the plurality of frequency bands (hereinafter, referred to as "component carriers") constituting the frequency band of A-EUTRA. That is, it is proposed that all the component carriers have a function capable of transmitting channels with the same configuration as that of EUTRA. On the other hand, in order to introduce a new technology, it is also simultaneously studied to set component carriers which do not have the compatibility with EUTRA and with which only the A-EUTRA can perform communication.

An OFDM (Orthogonal Frequency Division Multiplexing) system that is multi-carrier transmission has been adopted as a downlink in EUTRA. Further, a single-carrier communication system of a DFT (Discrete Fourier Transform)-spread OFDM system that is single-carrier transmission has been adopted as an uplink in EUTRA.

FIG. 15 is a view showing a schematic configuration of a downlink radio frame in EUTRA. In FIG. 15, the horizontal axis is time domain and the vertical axis is frequency domain. The downlink radio frame includes a plurality of Physical Resource Block (PRB) pairs. This physical resource block (PRB) pair is the unit of radio resource assignment and the like, and is made up of a frequency band of a predetermined width (PRB bandwidth) and a time zone (two slots=one subframe). Basically, one physical resource block (PRB) pair includes two physical resource blocks (PRBs) (PRB bandwidth×slots) continuous in time domain.

One physical resource block (PRB) includes 12 subcarriers in frequency domain, and 7 OFDM (Orthogonal Frequency Division Multiplexing) symbols in time domain. A system bandwidth is the communication bandwidth of the base station device. In time domain, there are a slot including 7 OFDM symbols, a subframe including two slots, and a radio frame including 10 subframes. Also, the unit made up of one subcarrier and one OFDM symbol is referred to as a resource element. Further, a plurality of physical resource blocks (PRBs) in accordance with the system bandwidth are allocated in the frequency direction in the downlink radio frame.

In each subframe, at least a downlink shared data channel used for the transmission of information data and system information and a downlink control channel used for the transmission of control data are allocated. The radio resource assignment of the downlink shared data channel is represented by the control data transmitted on the downlink control channel.

Although illustration is omitted in FIG. 15, a downlink pilot channel used for the channel estimation of the downlink shared data channel, the downlink control channel, and the like is allocated at predetermined resource element positions dispersed in the frequency direction and in the time direction in the unit of one resource element.

Although illustration is omitted in FIG. 15, because a broadcast channel used for the transmission of system information is allocated in the time domain and frequency domain defined in advance, the mobile station device, before starting the communication with the base station device, can receive the channel. Specifically, the channel is allocated in first to fourth OFDM symbols of a second slot of a first subframe of a radio frame in time domain, and in the center 72 subcarriers of the system bandwidth in frequency domain.

The system information includes the information necessary for the base station device and the mobile station device to communicate with each other, and is periodically transmitted toward an unspecified number of mobile station devices using the broadcast channel and the downlink shared data channel. Also, the items of the system information allocated in the broadcast channel and the downlink shared data channel are different, and the system information allocated in the broadcast channel includes a system bandwidth, radio frame number and the like. The system information allocated in the downlink shared data channel includes the transmission power control information of the uplink and downlink, and transmission mode information, and the like.

Also, the downlink control channel and the downlink shared data channel are not together allocated in the same OFDM symbol. The downlink control channel includes a plurality of uplink radio resource assignment information, downlink radio resource assignment information, and transmission power command information.

Non-patent document 1: 3GPP TS36.211 -v8.4.0(2008 -09), Physical Channels and Modulation (Release 8)

DISCLOSURE OF THE INVENTION

Problems to be Solved by the Invention

However, in the wireless communication system in which a base station device communicates with mobile station devices by using a plurality of component carriers compatible with EUTRA and component carriers for assigning radio resources to only the mobile station devices for A-EUTRA (hereinafter, referred to as "A-EUTRA component carrier"), the mobile station devices for EUTRA stand by on A-EUTRA component carriers and then the base station device may not communicate with the mobile station devices for EUTRA.

The present invention has been made in view of such circumstances, and it is an objective to provide a wireless communication system, wireless transmitting apparatus, wireless receiving apparatus, wireless transmission method, and wireless reception method that configure the channels of A-EUTRA component carriers on which the mobile station devices for EUTRA do not stand by, without almost changing the conventional channel configuration in EUTRA, in the wireless communication system in which the base station device communicates with the mobile station devices by using plural component carriers.

Means of Solving the Problems (1) In order to achieve the above-described objective, the present invention takes the measures as described below. That is, a wireless communication system of the present invention includes: a plurality of wireless receiving apparatuses; and a wireless transmitting apparatus for performing radio transmission to the wireless receiving apparatus by assigning one or more component carriers to a downlink, wherein the wireless transmitting apparatus includes a control channel element processing section for performing processing, for each of the component carriers, of changing a structure of a downlink control channel used to transmit control data for each of the wireless receiving apparatuses, and wherein the wireless receiving apparatus includes a control channel element reverse processing section that performs processing of restoring the structure of the downlink control channel changed for each of the component carriers, to the structure before change.

In this manner, because the wireless transmitting apparatus performs, for each component carrier, processing of changing the structure of the downlink control channel used to transmit the control data for each wireless receiving apparatus, the wireless receiving apparatus can switch whether the downlink control channel is conventionally processed or processed by the processing different from conventional processing, and further, the wireless receiving apparatus can receive the downlink control channel by all the component carriers by switching the reception processing of the downlink control channel. Further, conventional mobile station devices, when the processing of a downlink control channel, of its component carrier is different from the conventional processing, can not decode system information CCE correctly, and therefore can not decode the system information. As the result, no conventional wireless receiving apparatuses can stand by on the component carrier.

(2) Further, in the wireless communication system of the present invention, while the control channel element processing section performs processing of rearranging resource element groups constituting the downlink control channel by a method same as a rearrangement method used in EUTRA (Evolved Universal Terrestrial Radio Access), the control channel element reverse processing section performs processing of rearranging the rearranged resource element groups again to constitute said downlink control channel.

Hence, wireless receiving apparatuses for EUTRA do not stand by on A-EUTRA component carriers, and thus a wireless transmitting apparatus can communicate with the wireless receiving apparatuses for EUTRA.

(3) Further, in the wireless communication system of the present invention, the control channel element processing section performs processing of cyclically-shifting control channel elements constituting the downlink control channel to thereby change the structure of the downlink control channel for each of the component carriers; and the control channel element reverse processing section performs processing of cyclically-shifting the cyclically-shifted control channel elements in a reverse direction to thereby restore the structure of the downlink control channel changed for each of the component carriers, to the structure before change.

Thereby, it becomes possible to perform: the changing processing of the structure of the downlink control channel; and the processing of restoring the changed structure of the downlink control channel to the structure before change.

(4) Further, in the wireless communication system of the present invention, the control channel element processing section performs processing of cyclically-shifting a common search band which includes a plurality of control channel elements and by which all the wireless receiving apparatuses in communication search for the downlink control channel to thereby change the structure of the downlink control channel for each of the component carriers, and the control channel element reverse processing section performs processing of cyclically-shifting the cyclically-shifted common search band in a reverse direction to thereby restore the structure of the downlink control channel changed for each of the component carriers, to the structure before change.

Thereby, it becomes possible to perform: the changing processing of the structure of the downlink control channel; and the processing of restoring the changed structure of the downlink control channel to the structure before change.

(5) Further, in the wireless communication system of the present invention, the control channel element processing section performs processing of cyclically-shifting resource element groups constituting the downlink control channel to thereby change the structure of the downlink control channel for each of the component carriers, and the control channel element reverse processing section performs processing of cyclically-shifting the cyclically-shifted resource element groups in a reverse direction to thereby restore the structure of the downlink control channel changed for each of the component carriers, to the structure before change.

Thereby, it becomes possible to perform: the changing processing of the structure of the downlink control channel; and the processing of restoring the changed structure of the downlink control channel to the structure before change.

(6) Further, in the wireless communication system of the present invention, the wireless transmitting apparatus notifies the wireless receiving apparatus of a change method of the structure of the downlink control channel changed for each of the component carriers, and the wireless receiving apparatus performs processing of restoring the structure of the downlink control channel changed for each of the component carriers, to the structure before change, based on the change method notified from the wireless transmitting apparatus.

Thereby, it becomes possible to recognize how the structure of the downlink control channel is changed for each component carrier between the wireless transmitting apparatus and the wireless receiving apparatus.

(7) Further, in the wireless communication system of the present invention, when the wireless receiving apparatus performs processing of restoring the structure of the downlink control channel changed for each of the component carriers, to the structure before change by a plurality of processing methods, and when succeeded in the decoding of the downlink control channel by any of the processing methods, subsequently processes the downlink control channel by using the processing method that succeeded in the decoding of the downlink control channel.

With this configuration, because there is no need for broadcasting resource element group shift information, the overhead of the system information can be reduced.

(8) Further, a wireless transmitting apparatus of the present invention performs radio transmission for a plurality of wireless receiving apparatuses by assigning one or more component carriers to a downlink, and includes a control channel element processing section for performing, for each of the component carriers, processing of changing a structure of a downlink control channel used to transmit control data for each of the wireless receiving apparatuses.

In this manner, because the processing, for each component carrier, of changing the structure of the downlink control channel used to transmit the control data for each wireless receiving apparatus is performed, it is possible to switch whether the downlink control channel is conventionally processed or processed by the processing different from conventional processing.

(9) Further, a wireless receiving apparatus of the present invention performs communicating with a wireless transmitting apparatus that performs radio transmission by assigning one or more component carriers to a downlink, and includes a control channel element reverse processing section that performs processing of restoring a structure of the downlink control channel changed for each of the component carriers, to a structure before change.

Thereby, it becomes possible to receive the downlink control channel by all the component carriers by switching the reception processing of the downlink control channel. Further, conventional wireless receiving apparatuses, when the processing of a downlink control channel, of its component carrier is different from the conventional processing, cannot decode system information CCE correctly, and therefore cannot decode the system information. As the result, no conventional wireless receiving apparatuses stand by on the component carrier.

(10) Further, according to the present invention, there is provided a wireless transmission method in which a wireless transmitting apparatus performs radio transmission to a plurality of wireless receiving apparatuses by assigning one or more component carriers to a downlink, the method comprising the step of performing, for each of the component carriers, processing of changing a structure of a downlink control channel used to transmit control data for each of the wireless receiving apparatuses.

In this manner, because the processing, for each component carrier, of changing the structure of the downlink control channel used to transmit the control data for each wireless receiving apparatus is performed, it is possible to switch whether the downlink control channel is conventionally processed or processed by the processing different from conventional processing.

(11) Further, according to the present invention, there is provided a wireless reception method in which a wireless receiving apparatus performs communication with a wireless transmitting apparatus that performs radio transmission by assigning one or more component carriers to a downlink, the method comprising the step of performing processing of restoring a structure of the downlink control channel changed for each of the component carriers, to a structure before change.

Thereby, it becomes possible to receive the downlink control channel by all the component carriers by switching the reception processing of the downlink control channel. Further, conventional wireless receiving apparatuses, when the processing of a downlink control channel, of its component carrier is different from the conventional processing, cannot decode system information CCE correctly, and therefore can not decode the system information. As the result, no conventional wireless receiving apparatuses stand by on the component carrier.

Advantages of the Invention

According to the present invention, because the wireless transmitting apparatus performs the processing, for each component carrier, of changing the structure of a downlink control channel used to transmit the control data for each wireless receiving apparatus, the wireless receiving apparatus can switch whether the downlink control channel is conventionally processed or processed by the processing different from conventional processing, and further, the wireless receiving apparatus can receive the downlink control channel by all the component carriers by switching the reception processing of the downlink control channel. Further, conventional wireless receiving apparatuses, when the processing of a downlink control channel, of its component carrier is different from the conventional processing, can not decode system information CCE correctly, and therefore can not decode the system information. As the result, no conventional wireless receiving apparatuses can stand by on the component carrier.

Figure 1:
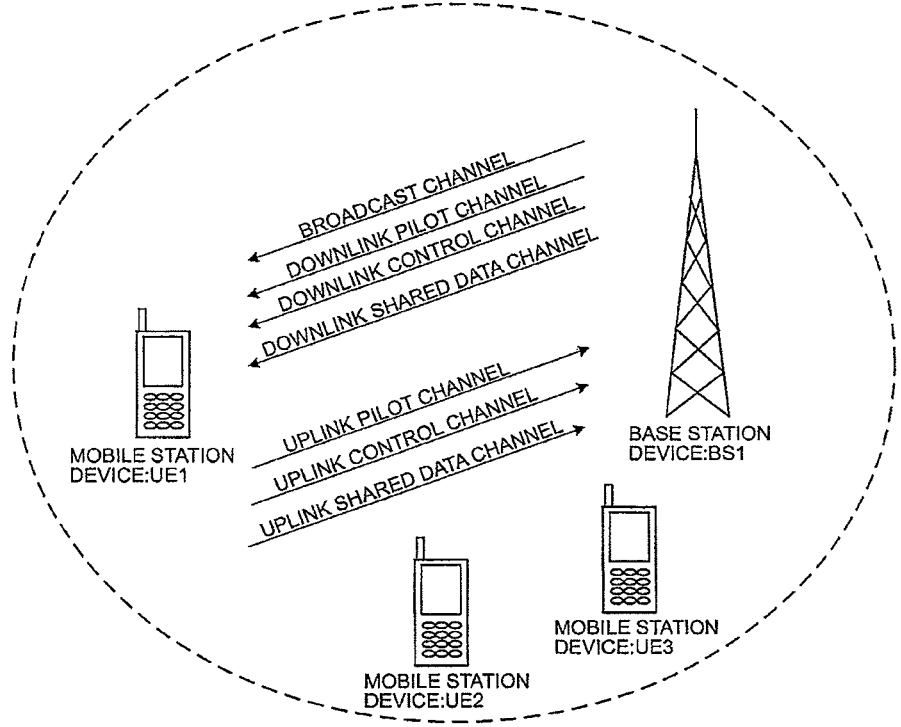
FIG. 1 is a view showing a schematic structure of channels according to embodiments of the present invention.

DESCRIPTION OF THE REFERENCE NUMERALS 10 radio resource controlling section
11 controlling section
12 reception processing section
13 transmission processing section
14 downlink shared data channel processing section
14a turbo encoding section
14b data modulating section
15 broadcast channel processing section
15a convolution encoding section
15b QPSK modulating section
16 downlink control channel processing section
16a convolution encoding section
16b QPSK modulating section
17 control channel element (CCE) processing section
17a control channel element multiplexing section
17b control channel element shift section
17c resource element group interleaving section
17d resource element group shift section
18 downlink pilot channel generating section
19 multiplexing section
20 transmission processing section for each transmitting antenna
  20a IFFT section
  20b GI inserting section
  20c D/A section
  20d transmission RF section
30 controlling section
31 reception processing section
32 transmission processing section
33 receiving section
  33a reception RF section
  33b A/D section
  33c GI removing section
  33d FFT section
34 demultiplexing section
35 channel estimation section
36 channel compensation section
37 control channel element (CCE) reverse processing section
  37a resource element group reverse shift section
  37b resource element group de-interleaving section
  37c control channel element reverse shift section
  37d control channel element demultiplexing section
38 demodulating section
39 decoding section

BEST MODES FOR CARRYING OUT THE INVENTION

Next, embodiments according to the present invention will be described with reference to figures. A wireless communication system according to the present embodiment includes a base station device (wireless transmitting apparatus) BS1 and a plurality of mobile station devices (wireless receiving apparatuses) UE1 to UE3 for receiving the signals that the base station device transmits.

FIG. 1 is a view showing a schematic structure of the channels according to the present embodiment. The base station device BS1 performs radio communication with the mobile station devices UE1 , UE2 , and UE3 using one or more component carriers. A downlink of radio communication from the base station device BS1 to the mobile station devices UE1 , UE2 , and UE3 in EUTRA includes a broadcast channel, a downlink pilot channel, a downlink control channel, and a downlink shared data channel, and the configuration of the downlink control channel can be changed for each component carrier.

Further, an uplink of radio communication from the mobile station devices UE1 , UE2 , and UE3 to the base station device BS1, of the present embodiment includes an uplink pilot channel, an uplink control channel, and an uplink shared data channel. Further, the mobile station devices UE1 and UE2 can receive only the downlink control channels with specific configurations, and the mobile station device UE3 can receive the downlink control channels with all configurations.

Figure 2:
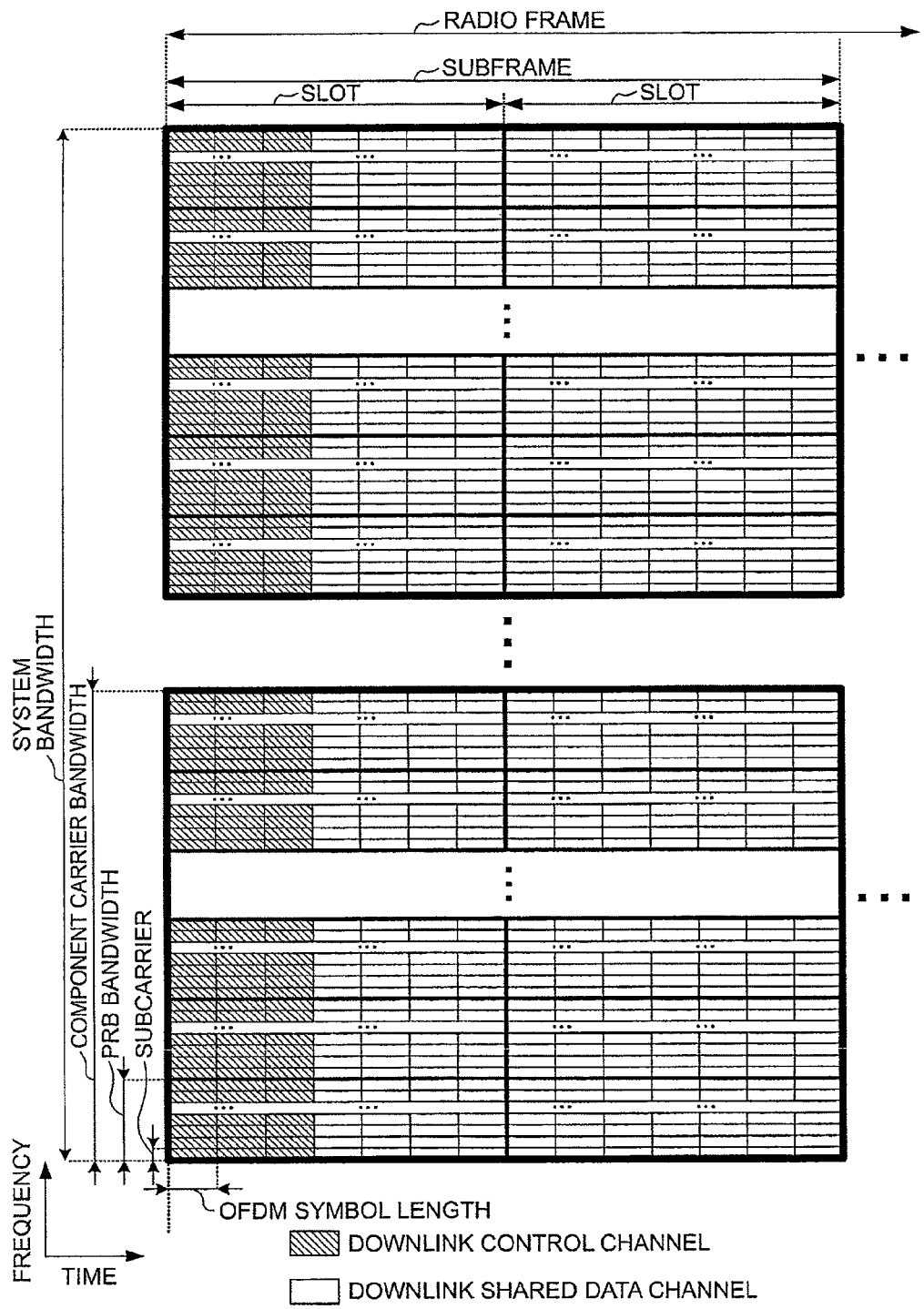
FIG. 2 is a view showing a schematic configuration of a downlink radio frame (radio resource) according to embodiments of the present invention.

FIG. 2 is a view showing a schematic configuration of a downlink radio frame (radio resource) according to the present embodiment. In FIG. 2, the horizontal axis is time domain and the vertical axis is frequency domain. The downlink radio frame includes a plurality of Physical Resource Block (PRB) pairs. This physical resource block (PRB) pair is the unit of radio resource assignment and the like, and is made up of a frequency band with a predetermined width (PRB bandwidth) and a time zone (two slots=one subframe). Basically, one physical resource block (PRB) pair includes two physical resource blocks (PRBs) continuous in time domain (PRB bandwidth×slots).

One physical resource block (PRB) includes 12 subcarriers in frequency domain, and 7 OFDM symbols in time domain. A component carrier bandwidth is a communication bandwidth of the base station device, and is made up of a plurality of physical resource blocks (PRBs). A system bandwidth is all communication bandwidths of the base station device, and is made up of a plurality of component carriers. It is not necessary that the component carriers be continuous in frequency domain.

In time domain, there are a slot including 7 OFDM symbols, a subframe including two slots, and a radio frame including 10 subframes. Also, the unit made up of one subcarrier and one OFDM symbol is referred to as a resource element. Further, a plurality of physical resource blocks (PRBs) is allocated in accordance with the system bandwidth in the downlink radio frame.

In each subframe, at least the downlink shared data channels used for the transmission of information data and system information and the downlink control channels used for the transmission of control data are allocated. The allocation of system information and information data in the downlink shared data channel is represented by the downlink control channel.

As to the downlink pilot channels used for the channel estimation of the downlink shared data channels and the downlink control channels, the illustration is omitted for simplicity of description in FIG. 2.

Although illustration is omitted in FIG. 2, because the broadcast channels used for the transmission of system information are allocated in the time domain and frequency domain in advance defined for each component carrier, the mobile station devices, before starting the communication with the base station device, can receive them. Specifically, they are allocated in a first to fourth OFDM symbols of a second slot of a first subframe of a radio frame in time domain, and in the center 72 subcarriers of the component carrier bandwidth in frequency domain. The system information includes the information necessary for the base station device to communicate with the mobile station devices, and is periodically transmitted for an unspecified number of mobile station devices using the broadcast channels and the downlink shared data channels for each component carrier.

Also, the items of the system information allocated in the broadcast channel and the downlink shared data channel are different, and the system information allocated in the broadcast channel includes a system bandwidth, radio frame number and the like. The system information allocated in the downlink shared data channel includes the transmission electric-power controlling information and transmission mode information of the uplink and downlink, and the like. Further, the parameters of each item of the system information may be different for each component carrier.

Also, the downlink control channel and the downlink shared data channel are not together allocated in the same OFDM symbol. The downlink control channel includes a plurality of uplink radio resource assignment information, downlink radio resource assignment information, and transmission electric-power command information.

A downlink control channel includes a plurality of control channel elements (CCEs), and the control channel element includes a plurality of resource elements of the same component carrier.

Figure 3:
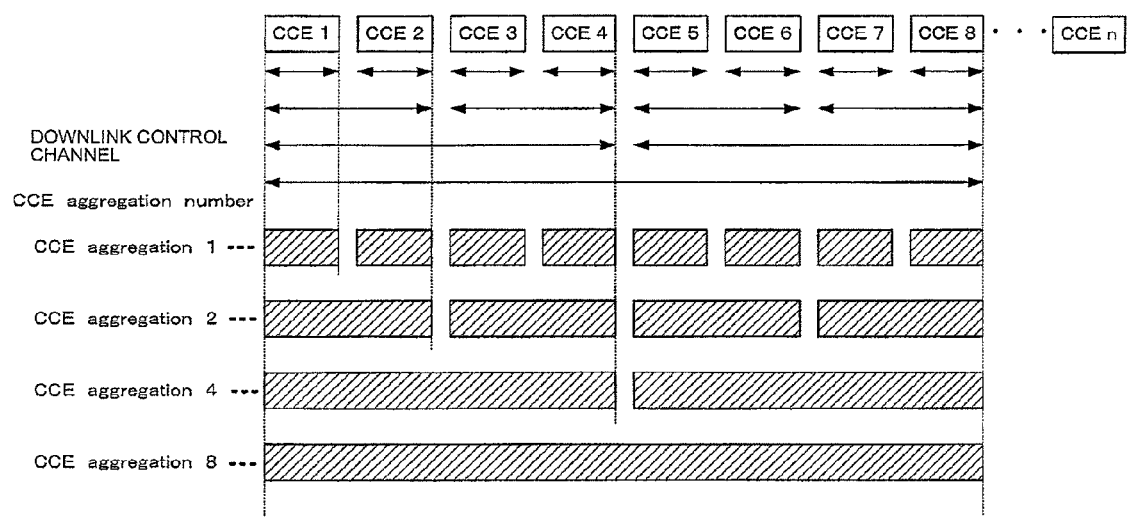
FIG. 3 is a view illustrating the logical relationship between a control channel element and a downlink control channel of a wireless communication system of the present invention.

FIG. 3 is a view illustrating the logical relationship between control channel elements and a downlink control channel of a wireless communication system of the present invention. Here, "CCE n" represents the control channel element of a control channel element index n. The control channel element index is a number identifying a control channel element.

The downlink control channel includes an aggregation having a plurality of control channel elements (hereinafter, referred to as "CCE aggregation"). The number of control channel elements constituting this aggregation is hereinafter referred to as "CCE aggregation number". FIG. 3 shows the case where the CCE aggregation number is 1, 2, 4 and 8.

Figure 4:
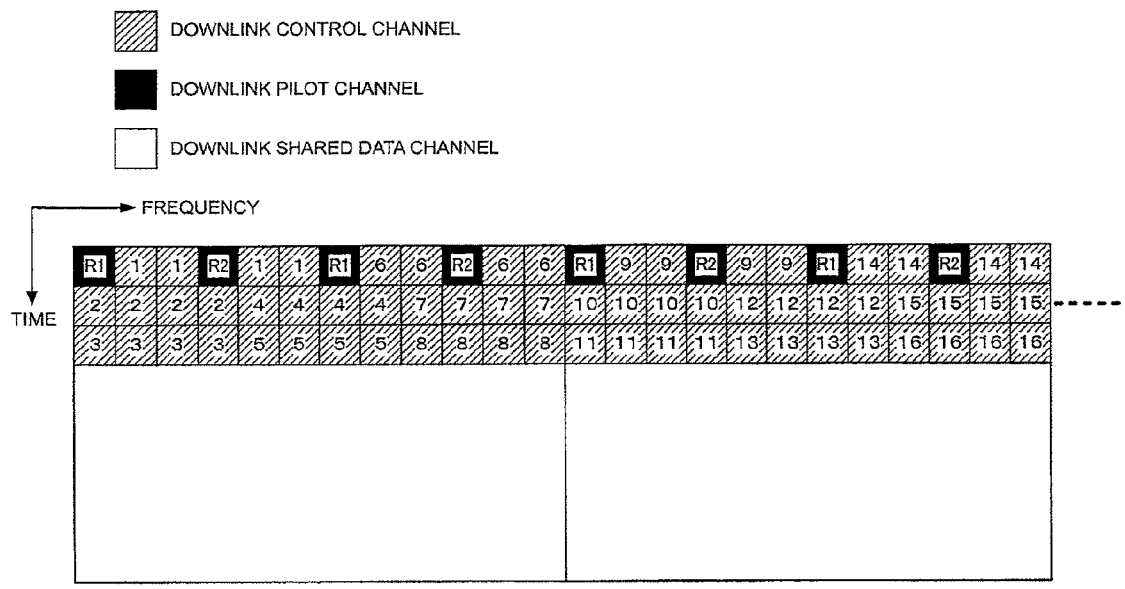
FIG. 4 is a view illustrating the allocation of resource element groups in a subframe of the downlink of embodiments of the present invention.

The control channel element includes a plurality of resource element groups (also referred to as mini-CCE) of the same component carrier. FIG. 4 is a view illustrating the allocation of resource element groups in a subframe of the downlink of the present embodiment. Here, the case where the downlink control channel includes first to third OFDM symbols, and the downlink pilot channels of two transmitting antennas are allocated is represented. In FIG. 4, the horizontal axis is time domain and the vertical axis is frequency domain. Further, in the allocation of FIG. 4a, one resource element group includes four resource elements, and unit made up of one subcarrier and includes the resource elements neighboring in the frequency domain, in the same OFDM symbol.

FIG. 4 shows that resource elements coded by the same code, of a downlink control channel belong to the same resource element group. Also, a resource element group includes resource elements R1 and R2 in which downlink pilot channels are allocated, the resource elements R1 and R2 being apart from each other. In FIG. 4, numbering is preferentially performed from the resource element group whose frequency is low. In the case where the frequencies of the groups are same, numbering is preferentially performed from the resource element group whose OFDM symbol number is small.

The control channel element includes a plurality of resource element groups of the same component carrier configured as shown in FIG. 4. For example, one control channel element includes 9 different resource element groups dispersed in time domain and frequency domain in a component carrier.

(First Embodiment)

Figure 5:
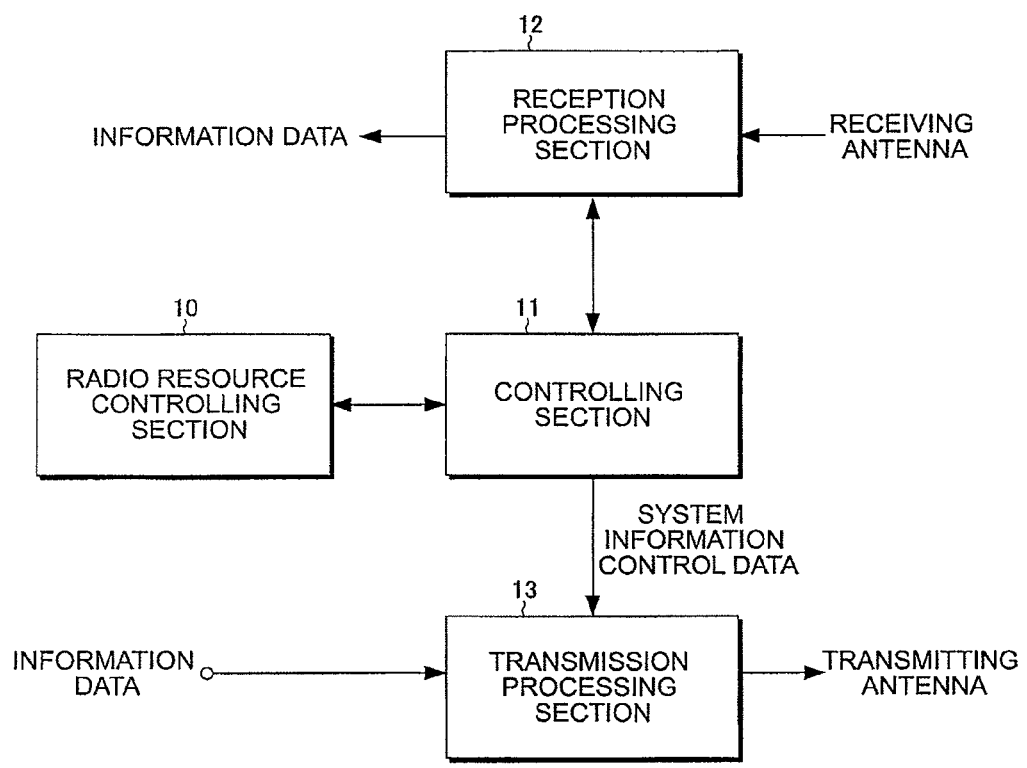
FIG. 5 is a schematic block diagram showing a configuration of a base station device BS1 according to a first embodiment of the present invention.

FIG. 5 is a schematic block diagram showing a configuration of the base station device BS1 according to a first embodiment of the present invention. As shown in FIG. 5, the base station device BS1 includes a radio resource controlling section 10, controlling section 11, reception processing section 12, and transmission processing section 13. The radio resource controlling section 10: controls a discontinuous transmission/reception cycle between the base station device BS1 and the mobile station devices UE1 to UE3, a modulation scheme/encoding rate of downlink shared data channel, transmission power, radio resource assignment of the downlink shared data channel, the number of OFDM symbols constituting downlink control channel, the downlink control channel, the downlink shared data channel, and the like; and outputs a control signal instructing these control contents to the controlling section 11, and in addition notifies the control signal of the mobile station devices UE1 to UE3 as control data and system information via the controlling section 11 and the transmission processing section 13.

The controlling section 11 outputs a control signal to the transmission processing section 13 and reception processing section 12 so as to control the transmission processing section 13 and reception processing section 12 based on a control signal input from the radio resource controlling section 10. The controlling section 11 performs the controlling of an allocation setting and the like to resource elements of each channel, for the transmission processing section 13 and reception processing section 12. Further, the controlling section 11 generates the system information transmitted using a broadcast channel and the downlink shared data channel, and the control data transmitted using a downlink control channel, based on the control signal input from the radio resource controlling section 10; outputs them to the transmission processing section 13; and instructs the transmission using the control signal.

The transmission processing section 13 generates a broadcast channel, a downlink pilot channel, a downlink control channel, and a downlink shared data channel based on the input from the controlling section 11, multiplexes each channel into a downlink radio frame, and transmits the channels to the mobile station devices UE1, UE2 and UE3 via a plurality of, for example, four transmitting antennas.

The reception processing section 12 performs via receiving antennas the reception of uplink pilot channel, uplink control channel, and uplink shared data channel transmitted by the mobile station devices UE1, UE2 and UE3 based on an input from the controlling section 11. Also, the explanation of the processing relating to the uplink (reception processing section), because not directly related to the present invention, is omitted.

Figure 6:
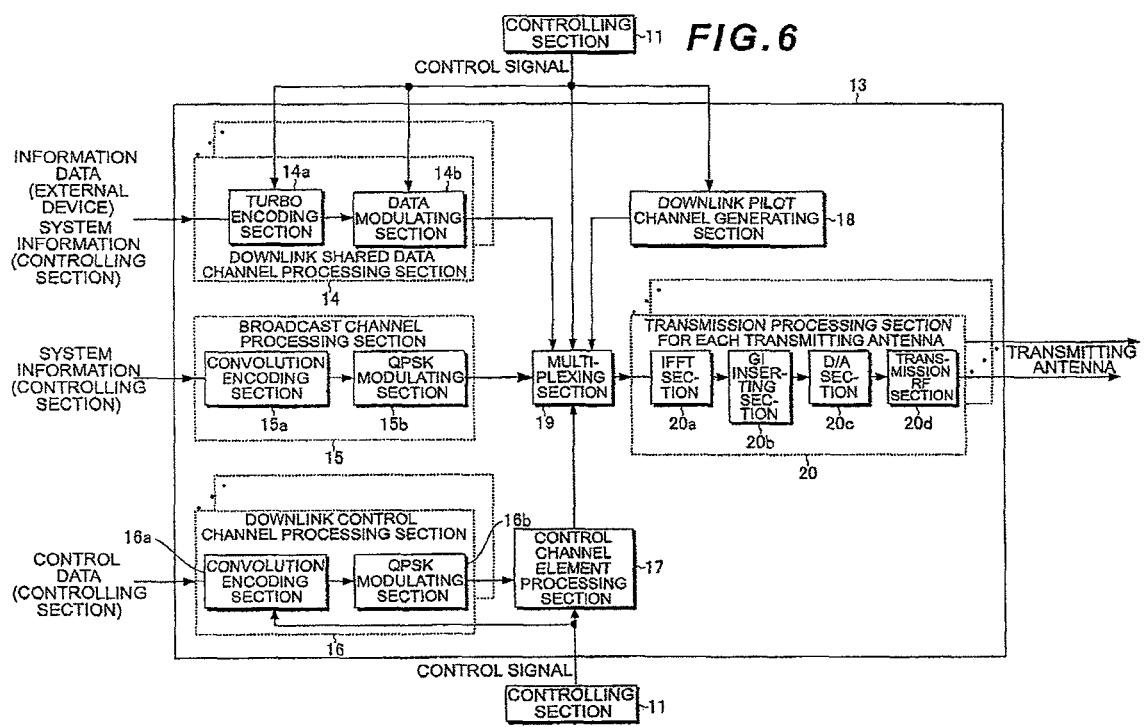
FIG. 6 is a schematic block diagram showing an internal configuration of a transmission processing section 13 of the base station device BS1 according to a first embodiment of the present invention.

FIG. 6 is a schematic block diagram showing an internal configuration of the transmission processing section 13 of the base station device BS1 of FIG. 5. The transmission processing section 13 of the base station device BS1 includes a plurality of downlink shared data channel processing sections 14, a broadcast channel processing section 15, a plurality of downlink control channel processing sections 16, a control channel element processing section 17, a downlink pilot channel generating section 18, a multiplexing section 19, and a transmission processing section for each transmitting antenna 20.

The plurality of downlink shared data channel processing sections 14, downlink control channel processing sections 16, and transmission processing sections for each transmitting antenna 20 respectively have similar configurations and functions.

Each of the downlink shared data channel processing sections 14 performs the baseband processing for transmitting the information data input from an external device, and the system information input from the controlling section (hereinafter, information data and system information together is referred to as "data") using OFDM system. That is, the turbo encoding section 14a of the downlink shared data channel processing section 14 performs the error correction encoding by using a turbo code, for enhancing error resistance of input data, based on an encoding rate instructed by a control signal from the controlling section 11. A data modulating section 14b modulates the data error-correction-encoded by the turbo encoding section 14a by using a modulation scheme such as QPSK (Quadrature Phase Shift Keying), 16QAM (16 Quadrature Amplitude Modulation), 64QAM (64 Quadrature Amplitude Modulation), or the like, based on a control signal from the controlling section 11; generates modulated symbols; and outputs them to the multiplexing section 19.

The broadcast channel processing section 15 performs the baseband processing for transmitting the system information input from the controlling section 11 by using OFDM system. That is, a convolution encoding section 15a of the broadcast channel processing section 15 performs the error correction encoding by using a convolution code, for enhancing the error resistance of input system information. A QPSK modulating section 15b modulates the system information error-correction-encoded by the convolution encoding section 15a by using QPSK modulation scheme, generates modulated symbols, and outputs them to the multiplexing section 19.

Each of the downlink control channel processing sections 16 performs the baseband processing for transmitting the control data input from the controlling section 11 by using OFDM system. That is, a convolution encoding section 16a of the downlink control channel processing section 16 performs the error correction encoding by using a convolution code, for enhancing the error resistance of the input control data, based on an encoding rate instructed by a control signal from the controlling section 11. A QPSK modulating section 16b modulates the control data error-correction-encoded by the convolution encoding section 16a by using QPSK modulation scheme, generates modulated symbols, and outputs them to the multiplexing section 19.

A control channel element processing section 17 associates the modulated symbols output from the downlink control channel processing sections 16, with control channel element indexes, rearranges resource element groups constituting control channel elements, and outputs them to the multiplexing section 19. The detailed description of the control channel element processing section 17 will be described below.

The downlink pilot channel generating section 18: generates, based on a control signal from the controlling section 11, downlink pilot symbols that each transmitting antenna of the base station device BS1 transmits on the downlink pilot channel, and that are used for channel estimation/channel compensation of downlink control channels, downlink shared data channels and the like; and outputs them to the multiplexing section 19.

The multiplexing section 19 allocates modulated symbols of the data, system information, and control data in which the processing such as encoding, modulating and the like is performed, and which each of the channel processing sections 14 to 16 outputs, and downlink pilot symbols, to resource elements for each transmitting antenna, based on a control signal from the controlling section 11.

The transmission processing sections for each transmitting antenna 20 transmit via each transmitting antenna the signals that the multiplexing section 19 multiplexes for each transmitting antenna. The transmission processing section for each transmitting antenna 20 includes an IFFT (Inverse Fast Fourier Transform) section 20a, a GI (Guard Interval) inserting section 20b, a D/A (Digital to Analogue conversion) section 20c, and a transmission RF (Radio Frequency) section 20d.

The IFFT section 20a performs inverse fast Fourier transform on a signal allocating modulated symbols and downlink pilot symbols to resource elements for each transmitting antenna, by using the multiplexing section 19, and performs the modulation of OFDM system. The GI inserting section 20b, by adding a guard interval to a signal OFDM-modulated by the IFFT section 20a, generates an OFDM symbol, and generates a digital signal with a baseband. The guard interval is obtained by a known method in which a part of the head or tail of a transmitted symbol is replicated.

The D/A section 20c converts the digital signal with the baseband input from the GI inserting section 20b, to an analogue signal. The transmission RF section 20d generates in-phase and quadrature components of an intermediate frequency from the analogue signal input from the D/A section 20c, removes the extra frequency component relative to the intermediate frequency band, converts (up-converts) a signal with the intermediate frequency to a signal with a high frequency, removes its extra frequency component, amplifies its electric power, outputs its signal to a corresponding transmitting antenna, and transmits it.

The base station device BS1 includes the transmission processing sections for each transmitting antenna 20 of only the number of transmitting antennas used for transmission, that is, four sections in the present embodiment, and the transmission processing section for each transmitting antenna 20 processes a signal for a corresponding transmitting antenna from the signals for each transmitting antenna that the multiplexing section 19 outputs.

Figure 7:
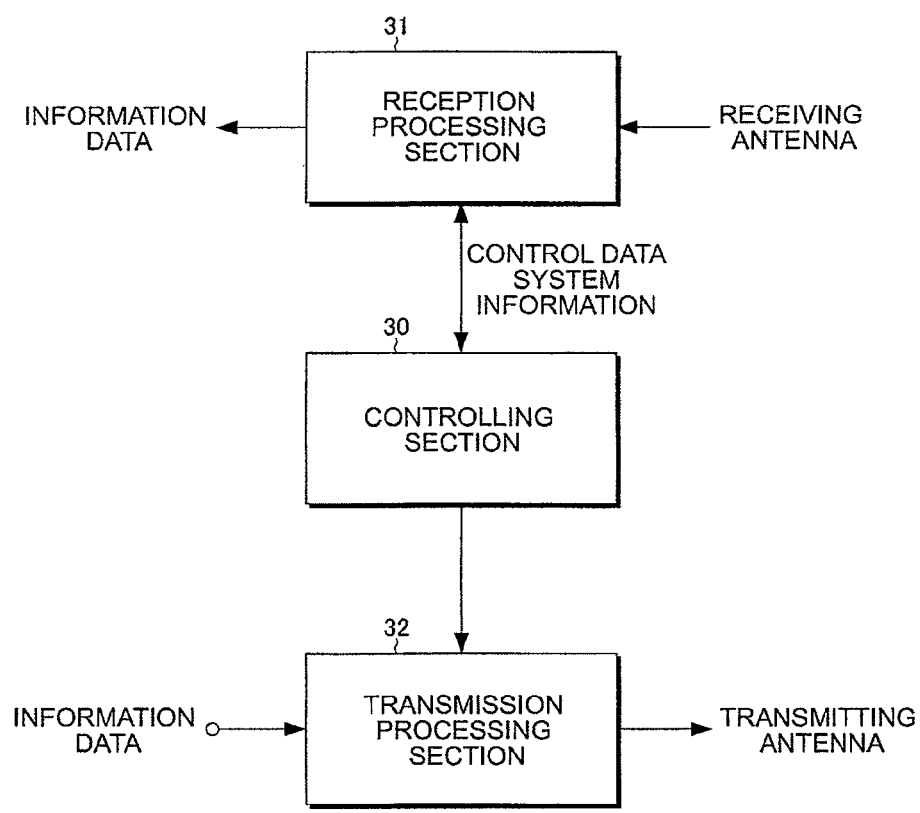
FIG. 7 is a schematic block diagram showing a configuration of mobile station devices UE1 to UE3 according to a first embodiment of the present invention.

FIG. 7 is a schematic block diagram showing a configuration of the mobile station devices UE1 to UE3 according to a first embodiment of the present invention. As shown in FIG. 7, the mobile station devices UE1 to UE3 include a controlling section 30, a reception processing section 31, and a transmission processing section 32. The reception processing section 31: performs reception processing, for a broadcast channel, downlink pilot channel, downlink control channel, and downlink shared data channel received from the base station device BS1 via a receiving antenna; and outputs the information data detected by this reception processing to an external device. Further, the reception processing section 31 outputs to the controlling section 30 the control data notified by using the downlink control channel, and the system information notified by using the downlink shared data channel and the broadcast channel.

The controlling section 30 outputs control signals to the transmission processing section 32 and the reception processing section 31 so as to perform the control of the transmission processing section 32 and the reception processing section 31, based on: the control data notified using the downlink control channel, and the system information notified using the downlink control channel and the broadcast channel, by the base station device BS1; and the like. Further, the controlling section 30 generates the control data transmitted on an uplink control channel, outputs it to the transmission processing section 32, and instructs its transmission using a control signal.

The reception processing section 32 performs the transmission of the information data input from an external device and the control data input from the controlling section via a transmitting antenna by using an uplink pilot channel, the uplink control channel, and an uplink shared data channel based on control signals from the controlling section 30.

Figure 8:
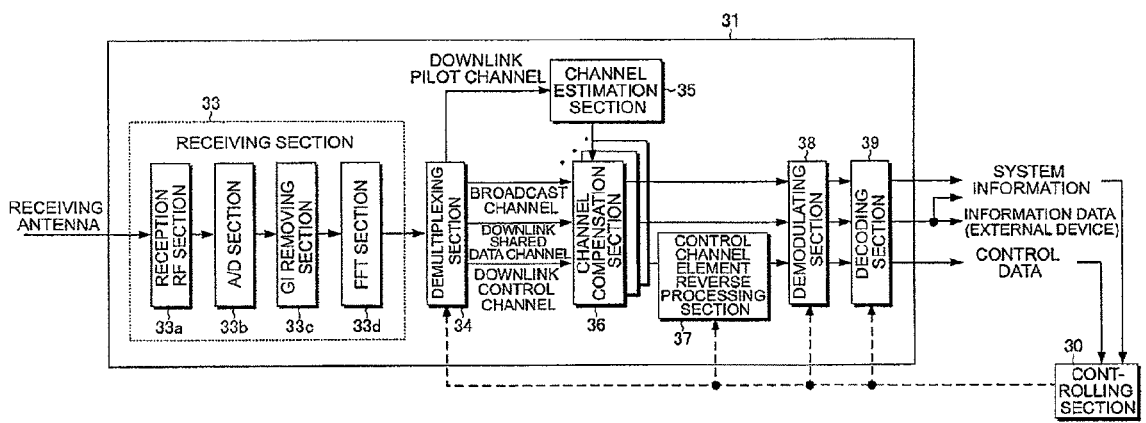
FIG. 8 is a schematic block diagram showing an internal configuration of a reception processing section 31 of the mobile station devices UE1 to UE3.

FIG. 8 is a schematic block diagram showing an internal configuration of the reception processing sections 31 of the mobile station devices UE1 to UE3 of FIG. 7. The reception processing sections 31 of the mobile station devices UE1 to UE3 includes a receiving section 33, a demultiplexing section 34, a channel estimation section 35, channel compensation sections 36, a control channel element reverse processing section 37, a demodulating section 38, and a decoding section 39 The plurality of channel compensation sections 36 respectively have similar configurations and functions.

The receiving section 33 processes a signal received via a receiving antenna, and outputs the processed signal to the demultiplexing section 34. The receiving section 33 includes a reception RF section 33a, an A/D (Analogue to Digital conversion) section 33b, a GI removing section 33c, and an FFT (Fast Fourier Transform) section 33d. The reception RF section 33a amplifies the signal received via the receiving antenna, converts (down-converts) its frequency to an intermediate frequency, removes its extra frequency component, controls the amplification level so that the signal level is appropriately maintained, performs quadrature demodulation based on in-phase and quadrature components of the received signals. The A/D section 33b converts an analogue signal quadrature-demodulated by the reception RF section 33a, to a digital signal. The GI removing section 33c removes the portion corresponding to the guard interval from the digital signal output by the A/D section 33b. The FFT section 33d preforms fast Fourier transform on a signal input from the GI removing section 33c, and performs the demodulation of OFDM system.

The demultiplexing section 34 extracts a broadcast channel, a downlink pilot channel, a downlink control channel, and a downlink shared data channel from the resource elements allocating them, from a signal fast-Fourier-transformed by the FFT section 33d, that is, a received signal demodulated using OFDM system, based on the instruction from the controlling section 30. Further, the demultiplexing section 34 outputs the downlink pilot channel to the channel estimation section 35, and outputs the broadcast channel, the downlink control channel, and the downlink shared data channel to the channel compensation sections 36.

The channel estimation section 35 estimates the channel fluctuation relative to each transmitting antenna of the base station device BS1, based on the reception result of the downlink pilot channel extracted by the demultiplexing section 34, and outputs channel fluctuation compensation values to the channel compensation sections 36. The channel compensation sections 36 perform the compensation of channel fluctuation of the signals of the broadcast channel, the downlink control channel, and the downlink shared data channel input from the demultiplexing section 34, based on the channel fluctuation compensation values input from the channel estimation section 35, outputs the broadcast channel and the downlink shared data channel to the demodulating section 38, and outputs the downlink control channel to the control channel element reverse processing section 37.

The control channel element reverse processing section 37 performs the reverse processing relative to the rearranging of resource element groups performed by the control channel element processing section 17 of the base station device BSI, for the downlink control channel in which the channel fluctuation is compensated, and which is input from the channel compensation section 36, and thereby reconfigures control channel elements to associate the reconfigured control channel elements with control channel element indexes. Further, it outputs control channel elements to the demodulating section 38, based on a control signal from the controlling section 30. The detailed description of the control channel element reverse processing section 37 will be described below.

The demodulating section 38 performs the demodulation of the broadcast channel and the downlink shared data channel in which the channel fluctuation is compensated by the channel compensation sections 36, and the CCE aggregation input by the control channel element reverse processing section 37. This demodulating section 38 performs the demodulation corresponding to the modulation schemes used in the data modulating section 14b, the QPSK modulating section 15b, and the QPSK modulating section 16b of the base station device BS1, and the modulation scheme of the downlink shared data channel is instructed by using a control signal from the controlling section 30 based on the information included in the downlink control channel.

The decoding section 39 decodes the broadcast channel, the downlink control channel, and the downlink shared data channel that the demodulating section 38 demodulates. This encoding is performed corresponding to the codes and encoding rates used in the turbo encoding section 14a, the convolution encoding section 15a, and the convolution encoding section 16a of the base station device BS1, and the encoding rate of the downlink shared data channel is instructed using a control signal from the controlling section 30 based on the information included in the downlink control channel. The information data transmitted using the downlink shared data channel, decoded in the decoding section 39 is output to an external device. Further, the system information transmitted using the downlink shared data channel, the system information transmitted using the broadcast channel, and the control data included in the downlink control channel that are decoded in the decoding section 39 are input to the controlling section 30.

Figure 9:
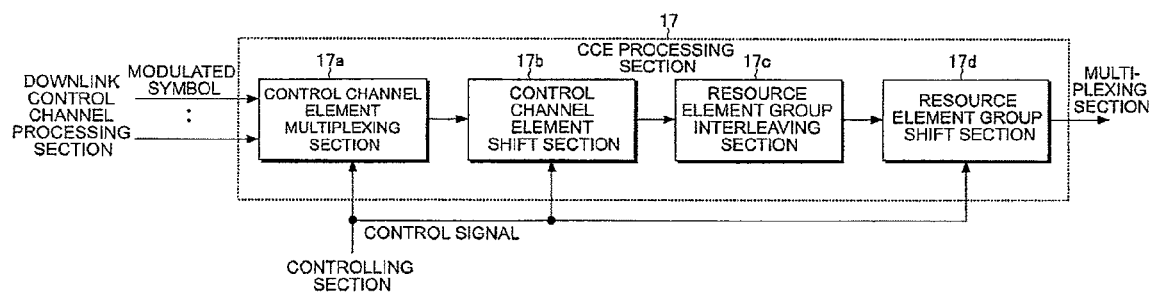
FIG. 9 is a schematic block diagram showing an internal configuration of a control channel element processing section 17 of the base station device BS1.

The control channel element (CCE) processing section 17 of the base station device BS1 and the control channel element reverse processing sections 37 of the mobile station devices UE1 to UE3 will be described below. FIG. 9 is a schematic block diagram showing an internal configuration of the control channel element processing section 17 of the base station device BS1 of FIG. 6. The control channel element processing section 17 of the base station device BS1 includes a control channel element multiplexing section 17a, a control channel element shift section 17b, a resource element group interleaving section 17c, and a resource element group shift section 17d.

The control channel element multiplexing section 17a multiplexes the modulated symbols of the downlink control channels input from the plurality of downlink control channel processing sections 16, into control channel elements instructed by a control signal from the controlling section 11, and outputs the control channel elements in which the multiplexing is performed, to a control channel element shift section 17b.

At this time, the controlling section 11 outputs a control signal for controlling the control channel element multiplexing section 17a to the control channel element multiplexing section 17a so as to allocate the control channel elements constituting the downlink control channel transmitting the downlink radio resource assignment information representing the radio resource assignment of the downlink shared data channel transmitting system information (hereinafter, referred to as "system information CCEs"), to any of a common search band made up of predetermined control channel element indexes and a predetermined CCE aggregation number for each component carrier.

The control channel elements including the control information for all the mobile station devices UE1 to UE3, or an unspecified number of mobile station devices UE1 to UE3 (any of the devices) are allocated to the common search band, and all the mobile station devices UE1 to UE3 attempts to demodulate/decode at least the control channel elements of the common search band.

The common search band will be described with reference to FIG. 3. For example, a common search band is made up of two CCE aggregations made up of CCE1 to CCE4, and CCE5 to CCE8, the CCE aggregation number being four, and one CCE aggregation made up of CCE1 to CCE8, the CCE aggregation number being eight, and system information CCEs are multiplexed into any of these three CCE aggregations.

The control channel element shift section 17b, when being instructed to perform cyclic shift in the component carrier by a control signal from the controlling section 11, performs cyclic shift by the predetermined value (one or more) input from the control channel element multiplexing section 17a, and outputs the input to the resource element group interleaving section 17c. The control channel element shift section 17b, when being instructed not to perform cyclic shift in the component carrier by a control signal from the controlling section 11, and outputs input control channel elements as it is to the resource element group interleaving section 17c.

In FIG. 5, the controlling section 11 generates "control channel element shift information" indicating whether the cyclic shift of control channel elements is performed or not in the control channel element shift section 17b, for each component carrier, and outputs the control channel element shift information to the transmission processing section 13 by including it in the system information transmitting using a broadcast channel.

In FIG. 9, the resource element group interleaving section 17c performs the interleaving to the control channel elements input from the control channel element shift section 17b for each component carrier, in the unit of resource group elements, rearranges the resource element groups constituting the control channel element, and outputs the resource element groups to the resource element group shift section 17d. A predetermined block interleaver is used for the interleaving.

The resource element group shift section 17d cyclically-shifts the rearranged resource element groups input from the resource element group interleaving section 17c, for each component carrier based on a control signal from the controlling section 11. The controlling section 11 outputs a control signal for controlling the resource element group shift section 17d so as to cyclically-shift the resource element groups by a value of a base station device identifier that the network assigns to the base station device.

Figure 10:
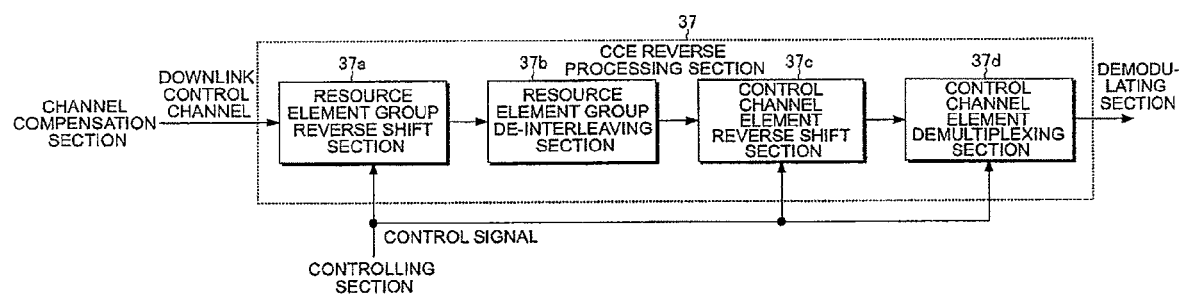
FIG. 10 is a schematic block diagram showing an internal configuration of a control channel element reverse processing section 37 of the mobile station devices UE1 to UE3.

FIG. 10 is a schematic block diagram showing an internal configuration of the control channel element reverse processing sections 37 of the mobile station devices UE1 to UE3 of FIG. 8. Each of the control channel element reverse processing sections 37 of the mobile station devices UE1 to UE3 includes a resource element group reverse shift section 37a, a resource element group de-interleaving section 37b, a control channel element reverse shift section 37c, and a control channel element demultiplexing section 37d.

The resource element group reverse shift section 37a cyclically-shifts the resource element groups constituting a downlink control channel input from the channel compensation section 36, by the same shift amount in the direction reverse to the cyclic shift of the resource element groups performed by the resource element group shift section 17d of the base station device BS1, for each component carrier, based on a control signal from the controlling section 30, and outputs the resultant resource element groups to the resource element group de-interleaving section 37b.

The resource element group de-interleaving section 37b performs the processing reverse to the interleaving performed by the resource element group interleaving section 17c of the base station device BS1 for each component carrier, rearranges the resource element groups, reconfigures control channel elements, and outputs the control channel elements to the control channel element reverse shift section 37c.

The control channel element reverse shift section 37c cyclically-shifts control channel elements by the same shift amount in the direction reverse to the cyclic shift of the resource elements performed by the control channel element shift section 17b of the base station device BS1 for each component carrier, based on a control signal from the controlling section 30, and outputs the resultant control channel elements to the control channel element demultiplexing section 37d.

The control channel element demultiplexing section 37d combines as CCE aggregations with various CCE aggregation numbers the control channel elements input from the control channel element reverse shift section 37c based on a control signal from the controlling section 30, and outputs the CCE aggregations in turn to the demodulating section 38.

Figure 11:
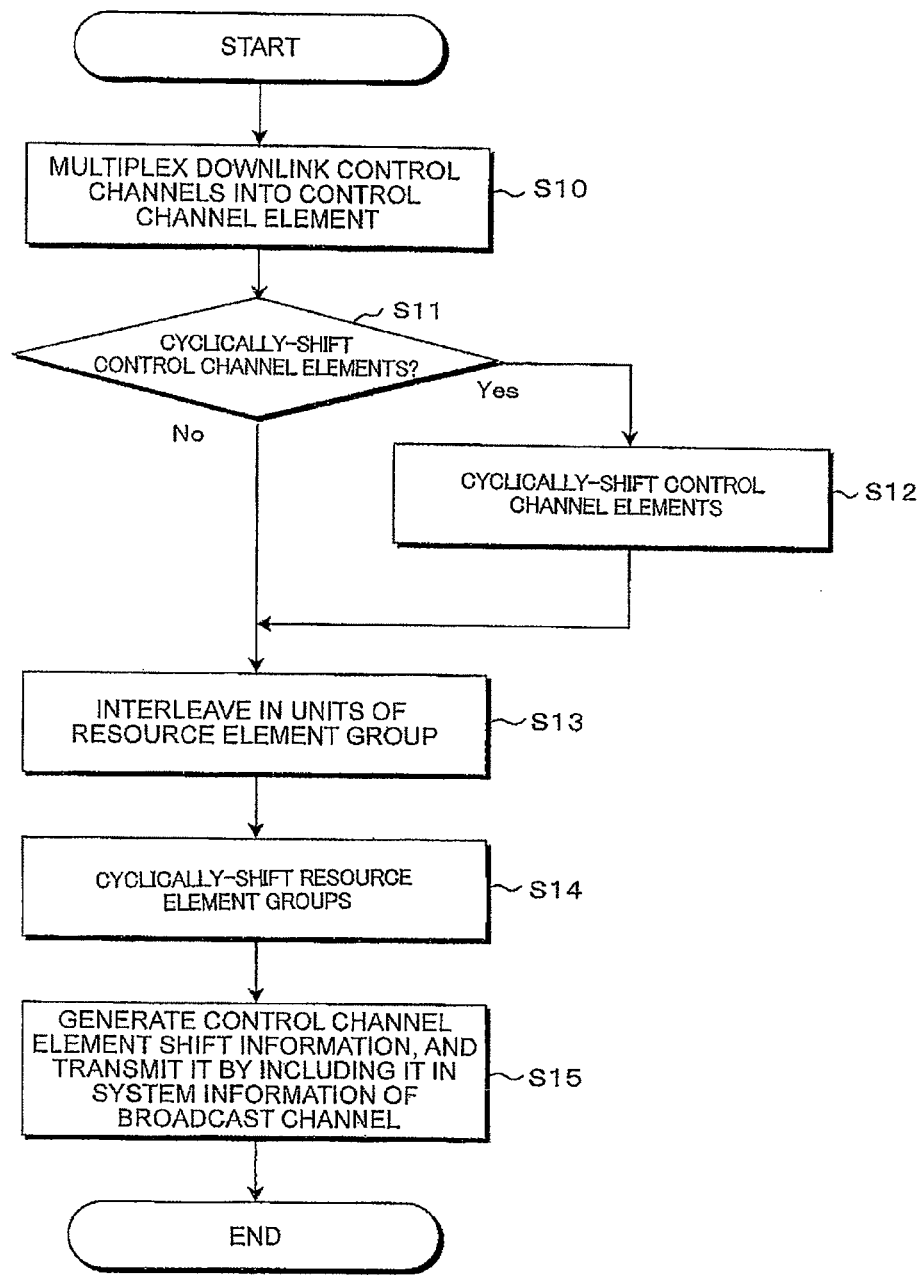
FIG. 11 is a flow chart showing the processing of control channel element by the control channel element processing section 17 and a controlling section 11 of the base station device BS1.

FIG. 11 is a flow chart showing the processing of control channel elements by the control channel element processing section 17 and the controlling section 11 of the base station device BS1 of FIG. 5. Although FIG. 11 shows the processing of control channel elements corresponding to one component carrier, actually, similar processing is performed in all the component carriers.

To begin with, the base station device BS1 multiplexes the downlink control channels processed in the downlink control channel processing section 16, into a control channel element based on a control signal from the controlling section 11 (step S10). Next, it is determined whether the control channel elements in which the multiplexing is performed are cyclically-shifted (step S11), based on a control signal from the controlling section 11. When it is determined that the control channel elements are cyclically-shifted (Yes in step S11), the control channel elements are cyclically-shifted by a predetermined amount (step S12).

On the other hand, in step S11, when it is determined that the control channel elements are not cyclically-shifted (No in step S11), the processing proceeds to step S13 without doing anything. Next, the interleaving to the control channel element processed in step S11 or S12 is performed in the unit of resource element group, and resource element groups are rearranged (step S13).

Next, the resource element groups are cyclically shifted (step S14). Next, in step S11, the base station device generates the control channel element shift information indicating whether control channel elements are cyclically shifted or not, and transmits it by including it in the system information of a broadcast channel.

Figure 12:
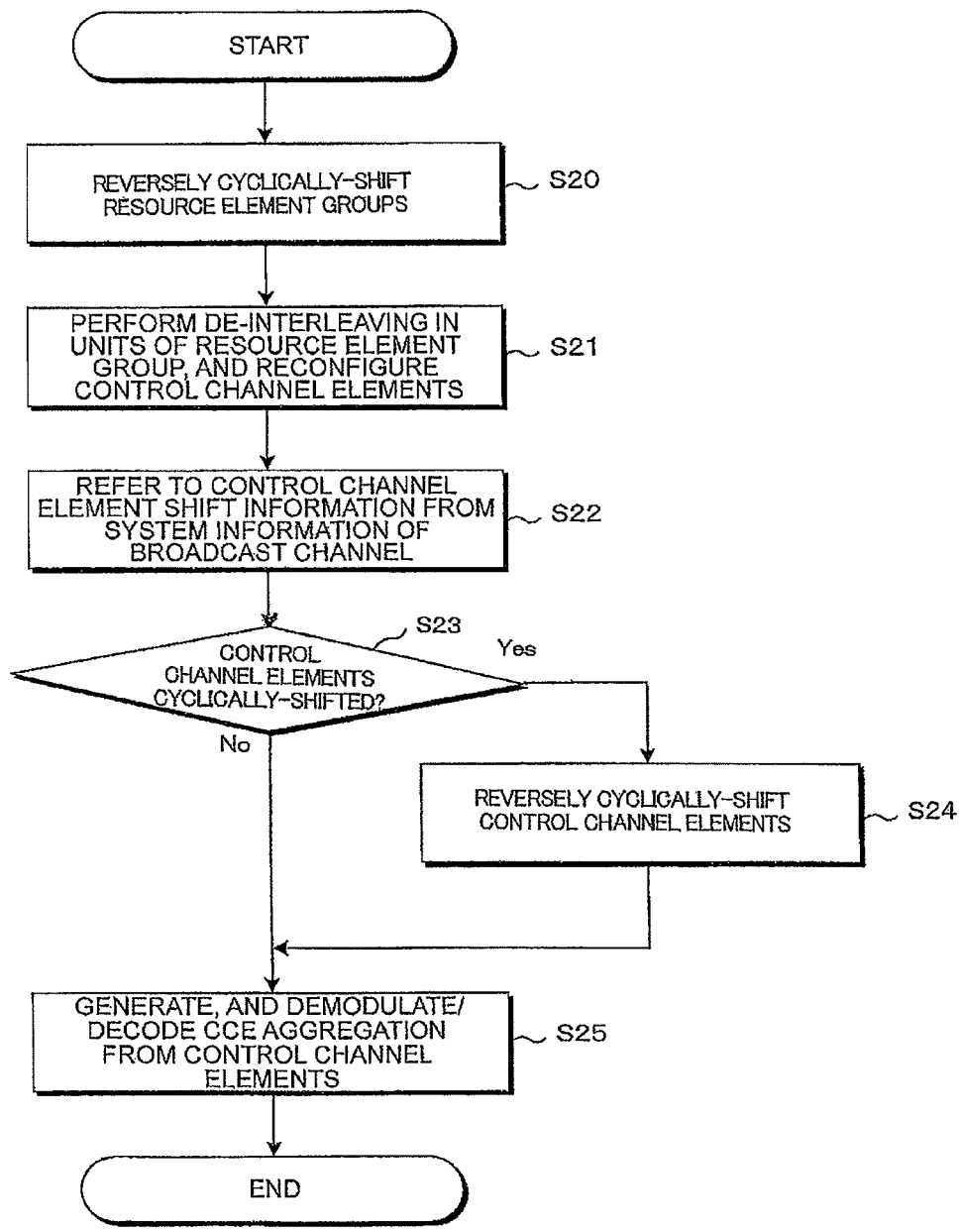
FIG. 12 is a flow chart showing the processing of control channel element by the control channel element processing section 37 and a controlling section 30 of the mobile station devices UE1 to UE3.

FIG. 12 is a flow chart showing the processing of control channel elements by the control channel element reverse processing section 37 and the controlling section 30 of the mobile station devices UE1 to UE3. Although FIG. 12 shows the processing of control channel elements corresponding to one component carrier, actually, similar processing is performed in all the component carriers.

To begin with, each of the mobile station devices UE1 to UE3 cyclically-shifts a downlink control channel which is demultiplexed in the demultiplexing section 34, and for which the compensation of channel fluctuation is performed by the channel compensation sections 36, in the reverse direction to the cycle shift performed in the base station device BS1, in the unit of resource element group (step S20). Next, the reverse processing of the interleaving performed in the base station device BS1 is performed on the cyclically-shifted downlink control channel, in the unit of resource element group, and thereby the control channel elements are reconfigured (step S21).

Next, the mobile station devices refer to the control channel element shift information included in received broadcast channels (step S22). When the control channel element shift information indicates that control channel elements are cyclically-shifted (Yes instep S23), the control channel elements are cyclically-shifted in the reverse direction to the cycle shift performed in the base station device BS1 (step S24).

On the other hand, in step S23, when the control channel element shift information indicates that control channel elements are not cyclically-shifted (No in step S23), the processing proceeds to step S25 without doing anything. Next, a plurality of types of CCE aggregations is generated from the control channel elements processed in step S23 or S24, the CCE aggregations are demodulated/decoded (step S25).

Although the foregoing has described the method to broadcast control channel element shift information with reference to figures, the base station device BS1 may not broadcast the control channel element shift information, and the mobile station device: may output both of a sequence whose control channel elements are cyclically-shifted and a sequence whose control channel elements are not cyclically-shifted in the control channel element reverse shift section, to the control channel element demultiplexing section; may generate CCE aggregations for the both sequences, in the control channel element demultiplexing section; may perform the demodulating/decoding of the CCE aggregations; perform blind detection when the sequence that succeeds in the decoding of system information CCEs is correct; and may use the cycle shift of control channel elements that succeeds in decoding of the information CCEs in the subsequent processing of control channel elements. In this way, until the decoding of system information CCEs is succeeded in, although the load of the demodulating/decoding process of the downlink control channels of the mobile station devices UE1 to UE3 increases, because there is no need for broadcasting control channel element shift information, the overhead of the system information can be reduced.

(Second Embodiment)

A second embodiment of the present invention switches the cyclic shift of a common search band for each component carrier, instead of switching the cyclic shift of control channel elements for each component carrier, in the first embodiment of the present invention. Because the configuration of the base station device and mobile station devices of the second embodiment is similar to the first embodiment except for the control channel element processing section 17 of the base station device BS1 and control channel element reverse processing sections 37 of the mobile station devices UE1 to UE3, only the control channel element processing section 17 of the base station device BS1 and control channel element reverse processing sections 37 of the mobile station devices UE1 to UE3 will be shown and described.

Figure 13:
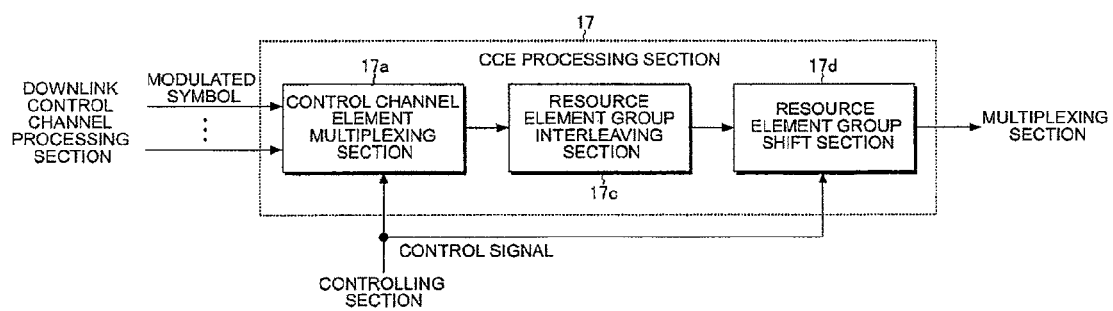
FIG. 13 is a schematic block diagram showing an internal configuration of the control channel element processing section 17 of the base station device BS1 of a second embodiment of the present invention.

FIG. 13 is a schematic block diagram showing an internal configuration of the control channel element processing section 17 of the base station device BS1 of the second embodiment of the present invention. The control channel element processing section 17 of the base station device BS1 includes the control channel element multiplexing section 17a, the resource element group interleaving section 17c, and the resource element group shift section 17d.

The control channel element multiplexing section 17a multiplexes the modulated symbols of the downlink control channels input from the plurality of downlink control channel processing sections 16, into control channel elements instructed by a control signal from the controlling section 11, and outputs the control channel elements in which the multiplexing is performed, to the resource element group interleaving section 17c. Further, the control channel element multiplexing section 17a multiplexes system information CCEs into a common search band.

At this time, the controlling section 11 controls whether or not the indexes of the control channel elements constituting the common search band for each component carrier the control channel elements are cyclically-shifted by a predetermined value (one or more). One example of the cyclic shift of the common search band will be described with reference to FIG. 3. For example, when a common search band is made up of: two CCE aggregations made up of CCE1 to CCE4, and CCE5 to CCE8, the CCE aggregation number being four; and one CCE aggregations made up of CCE1 to CCE8, the CCE aggregation number being eight, if the control channel element indexes are cyclically-shifted by one shift, the common search band is made up of: two CCE aggregations made up of CCE2 to CCE5, and CCE6 to CCE9, the CCE aggregation number being four; and one CCE aggregations made up of CCE2 to CCE9, the CCE aggregation number being eight.

Further, the controlling section 11 generates "common search band shift information" indicating whether the common search band is cyclically-shifted or not, for each component carrier, and outputs the common search band shift information to the transmission processing section 13 by including it in the system information transmitting using a broadcast channel.

The resource element group interleaving section 17c performs the interleaving to the control channel element input from the control channel element multiplexing section 17a for each component carrier, in the unit of resource group elements, rearranges the resource element groups constituting the control channel element, and outputs the resource element groups to the resource element group shift section 17d. A predetermined block interleaver is used for the interleaving.

The resource element group shift section 17d cyclically shifts the rearranged resource element groups input from the resource element group interleaving section 17c, for each component carrier based on a control signal from the controlling section 11. The controlling section 11 outputs a control signal for controlling the resource element group shift section 17d so as to cyclically-shift the resource element groups by a value of a base station device identifier that the network assigns to the base station device.

Figure 14:
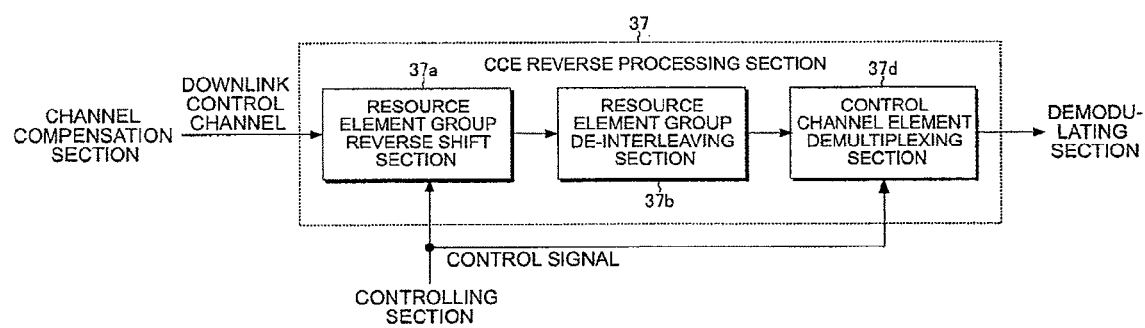
FIG. 14 is a schematic block diagram showing an internal configuration of the control channel element reverse processing section 37 of the mobile station devices UE1 to UE3 of the second embodiment of the present invention.
Figure 15:
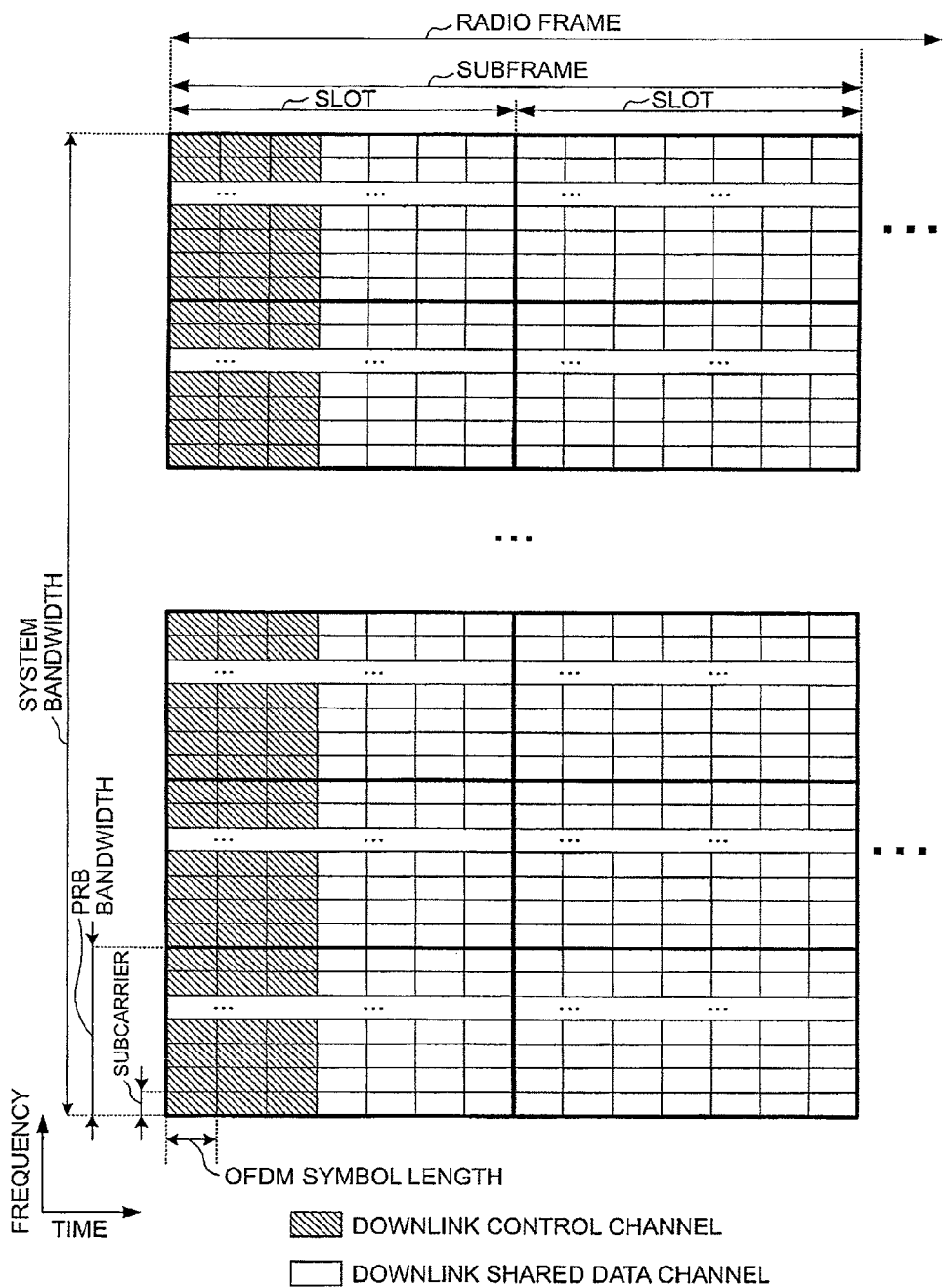
FIG. 15 is a view showing a schematic configuration of a downlink radio frame in EUTRA.

FIG. 14 is a schematic block diagram showing an internal configuration of the control channel element reverse processing sections 37 of the mobile station devices UE1 to UE3 of the second embodiment of the present invention. Each of the control channel element reverse processing sections 37 of the mobile station devices UE1 to UE3 includes the resource element group reverse shift section 37a, the resource element group de-interleaving section 37*b*, and the control channel element demultiplexing section 37*d*.

The resource element group reverse shift section 37*a* cyclically-shifts the resource element groups constituting a downlink control channel input from the channel compensation section 36, by the same shift amount in the direction reverse to the cyclic shift of the resource element groups performed by the resource element group shift section 17*d* of the base station device BS1, for each component carrier, based on a control signal from the controlling section 30, and outputs the resultant resource element groups to the resource element group de-interleaving section 37*b*.

The resource element group de-interleaving section 37*b* performs the processing reverse to the interleaving performed by the resource element group interleaving section 17*c* of the base station device BS1 for each component carrier, rearranges the resource element groups, reconfigures control channel elements, and outputs the control channel elements to the control channel element demultiplexing section 37*d*.

The control channel element demultiplexing section 37*d* combines as CCE aggregations with various CCE aggregation numbers the control channel elements input from resource element group de-interleaving section 37*b* based on a control signal from the controlling section 30, and outputs the CCE aggregations in turn to the demodulating section 38.

Further, when that the control channel elements of the common search band is cyclically shifted is indicated by the common search band shift information, the controlling section 30 controls the control channel element demultiplexing section 37*d* by using a control signal so that the control channel element demultiplexing section 37*d* reconfigures the common search band from the cyclically-shifted control channel elements and outputs CCE aggregations to the demodulating section 38.

Although the foregoing has described the method to broadcast common search band shift information with reference to figures, the base station device BSI may not broadcast the common search band shift information, and the mobile station device: may reconfigure the common search band from both of the control channel elements that are cyclically-shifted and the control channel elements that are not cyclically-shifted, in the control channel element demultiplexing section; may perform the demodulating/decoding of the CCE aggregations constituting the common search band; perform blind detection when the common search band that succeeds in the decoding of system information CCEs is correct; and may use the common search band that succeeds in decoding of the information CCEs in the subsequent processing of control channel elements. In this way, until the decoding of system information CCEs is succeeded in, although the load of the demodulating/decoding process of the downlink control channels of the mobile station devices UE1 to UE3 increases, because there is no need for broadcasting common search band shift information, the overhead of the system information can be reduced.

(Third Embodiment)

A third embodiment of the present invention switches the value of the cyclic shift of resource element groups for each component carrier, instead of switching the cyclic shift of control channel elements for each component carrier, in the first embodiment of the present invention. The configuration of the base station device BS1 of the mobile station devices UE1 to UE3 of the third embodiment is similar to the second embodiment of the present invention.

The control channel element processing section of the base station device BS1 of the third embodiment of the present invention, with reference to FIG. 13. The control channel element processing section 17 of the base station device BS1 of the third embodiment of the present invention includes the control channel element multiplexing section 17*a*, the resource element group interleaving section 17*c*, and the resource element group shift section 17*d*.

The control channel element multiplexing section 17*a* multiplexes the modulated symbols of the downlink control channels input from the plurality of downlink control channel processing sections 16, into control channel elements instructed by a control signal from the controlling section 11, and outputs the control channel elements in which the multiplexing is performed, to the resource element group interleaving section 17*c*. Further, the control channel element multiplexing section 17*a* multiplexes system information CCEs into a common search band.

The resource element group interleaving section 17*c* performs the interleaving to the control channel element input from the control channel element multiplexing section 17*a* for each component carrier, in the unit of resource element groups, rearranges the resource element groups constituting the control channel element, and outputs the resource element groups to the resource element group shift section 17*d*. A predetermined block interleaver is used for the interleaving.

The resource element group shift section 17*d* cyclically-shifts the rearranged resource element groups input from the resource element group interleaving section 17*c*, for each component carrier based on a control signal from the controlling section 11. The controlling section 11 controls whether the resource element groups by a value of a base station device identifier that the network assigns to the base station device are cyclically-shifted or the resource element groups by a predetermined value (0 or more) different from the base station device identifier are cyclically-shifted, for each component carrier. Further, the controlling section 11 generates "resource element group shift information" indicating whether a value of the cycle shift of the resource element groups is the same as or different from that of the base station device identifier, for each component carrier, and outputs resource element group shift information to the transmission processing section 13 by including it in the system information transmitting using the broadcast channel.

The control channel element reverse processing sections 37 of the mobile station device UE1 to UE3 of the third embodiment of the present invention, with reference to FIG. 14. Each of the control channel element reverse processing sections 37 of the mobile station devices UE1 to UE3 of the third embodiment of the present invention includes the resource element group reverse shift section 37*a*, the resource element group de-interleaving section 37*b*, and the control channel element demultiplexing section 37*d*.

The resource element group reverse shift section 37*a* cyclically-shifts the resource element groups constituting a downlink control channel input from the channel compensation section 36, by the same shift amount in the direction reverse to the cyclic shift of the resource element groups performed by the resource element group shift section 17*d* of the base station device BS1, for each component carrier, based on a control signal from the controlling section 30, and outputs the resultant resource element groups to the resource element group de-interleaving section 37*b*.

At this time, the controlling section 30 refers to the resource element group shift information included in the system information of a received broadcast channel, and outputs a control signal to the resource element group reverse shift section 37*a* so that the resource element group reverse shift section 37a determines a value of the cycle shift of the resource element groups, and performs cyclic shift by the determined value.

The resource element group de-interleaving section 37b performs the processing reverse to the interleaving performed by the resource element group interleaving section 17c of the base station device BSI for each component carrier, rearranges the resource element groups, reconfigures control channel elements, and outputs the control channel elements to the control channel element demultiplexing section 37d.

The control channel element demultiplexing section 37d combines as CCE aggregations with various CCE aggregation numbers the control channel elements input from the resource element group reverse shift section 37a based on a control signal from the controlling section 30, and outputs the CCE aggregations in turn to the demodulating section 38.

Although the foregoing has described the method to broadcast control channel element shift information with reference to figures, the base station device BSI may not broadcast the control channel element shift information, and the mobile station devices UE1 to UE3: may output both of a sequence whose resource element groups are reversely cyclically-shifted by the same value as a mobile station device identifier and a sequence whose resource element groups are reversely cyclically-shifted by a predetermined value different from the mobile station device identifier, in the resource element group reverse shift section, to the resource element group de-interleaving section; may performs a processing for the both sequences and output the both sequences to the control channel element demultiplexing section, in the resource element group de-interleaving section; may generate CCE aggregations for the both sequences, in the control channel element demultiplexing section; may perform the demodulating/decoding of the CCE aggregations; perform blind detection when the sequence that succeeds in the decoding of system information CCEs is correct; and may use the cycle shift of the resource element groups that succeeds in decoding of the information CCEs in the subsequent processing of control channel elements.

In this way, until the decoding of system information CCEs is succeeded in, although the load of the demodulating/decoding process of the downlink control channels of the mobile station devices UE1 to UE3 increases, because there is no need for broadcasting resource element group shift information, the overhead of the system information can be reduced.

The base station device BS1 performs the switching of conventional processing of a downlink control channel or processing different from the conventional processing, for each component carrier, as in the above-described first to third embodiments of the present invention, the reception processing of the downlink control channel is switched as in the mobile station devices UE1, UE2, and UE3 of the first, second, and third embodiments of the present invention, and thereby the downlink control channel can be received by all the component carriers.

On the other hand, conventional mobile station devices, when the processing of a downlink control channel, of its component carrier is different from the conventional processing, can not decode system information CCEs correctly, and therefore can not decode the system information. As the result, no conventional mobile station devices stand by on the component carrier. That is, without almost changing the configuration of the base station device BS1 and the mobile station devices UE1 to UE3, from conventional configurations, the component carrier can be the component carrier dedicated to only the mobile station devices UE1 to UE3 of the first, second, and third embodiments of the present invention. Particularly, the conventional processing of the downlink control channel as described above is the same as the processing of the downlink control channel in EUTRA, and conventional mobile station devices represents the mobile station devices for EUTRA.

A program that operates in the base station device BS1 and the mobile station devices UE1 to UE3 regarding the present invention is the program (program for causing computers to function) that controls CPU (Central Processing Unit) and the like so as to realize the function of the above-described embodiments regarding the present invention. Then, the information handled in these devises is temporarily stored in a RAM (Random Access Memory) during the processing; thereafter stored in various ROMs such as a Flash ROM (Read Only Memory) and the like, and HDDs (Hard Disk Drives); and if necessary, read out and corrected/written by a CPU.

Further, by recording in a computer readable recording medium a program for realizing the functions of: the radio resource controlling section 10, and controlling section 11 in FIG. 5; the downlink shared data channel processing section 14, broadcast channel processing section 15, downlink control channel processing section 16, downlink pilot channel generating section 18, multiplexing section 19, and IFFT section 20a, GI inserting section 20b, D/A section 20c, and transmission RF section 20d in FIG. 6; the controlling section 30 in FIG. 7; the reception RF section 33a, A/D section 33b, GI removing section 33c, FFT section 33d, demultiplexing section 34, channel estimation section 35, channel compensation section 36, demodulating section 38, and decoding section 39 in FIG. 8; the control channel element multiplexing section 17a, control channel element shift section 17b, resource element group interleaving section 17c, and resource element group shift section 17d in FIG. 9; the resource element group reverse shift section 37a, resource element group de-interleaving section 37b, control channel element reverse shift section 37c, and control channel element demultiplexing section 37d in FIG. 10; the control channel element multiplexing section 17a, resource element group interleaving section 17c, and resource element group shift section 17d in FIG. 13; and the resource element group reverse shift section 37a, resource element group de-interleaving section 37b, and control channel element demultiplexing section 37d in FIG. 14, reading in the computer system the program recorded in this recording medium and executing it, the processing of each section may be performed. Also, the "computer system" as used herein includes OS and hardwares such as peripheral devices and the like.

Further, the "computer readable recording medium" refers to portable mediums such as a flexible disk, a magnetic optical disk, a ROM, a CD-ROM, and the like, and a storage device such as a hard disk built in the computer system. Furthermore, the "computer readable recording medium" includes a medium dynamically holding a program for a short time, such as a communication line in the case where the program is transmitted through the network such as the Internet or the communication line such as a telephone line, and a medium holding a program for a given time, such as a volatile memory in a computer system serving as a server or a client in the above-described case. In addition, the above-described program may be one for realizing a part of the aforementioned functions, and further may be one for realizing the aforementioned functions by being combined with a program already recorded in a computer system.

Although the foregoing has described embodiments of the present invention in detail with reference to figures, specific configurations are not limited to this embodiments, and also includes changes in design and the like without departing from the scope of the present invention.

The invention claimed is:

1. A base station device configured to communicate with a mobile station device, the base station device comprising:
   transmission circuitry configured to transmit a first physical downlink control channel for the mobile station device on the first downlink component carrier, and a second physical downlink control channel for the mobile station device on the second downlink component carrier, wherein
   the transmission circuitry is configured to cyclically-shift each of a first block of groups in a subframe and a second block of groups in the subframe,
   each group in the first block of groups includes four or less symbols associated with the first physical downlink control channel,
   each group in the second block of groups includes four or less symbols associated with the second physical downlink control channel.

2. The base station device according to claim 1, wherein the transmission circuitry includes an antenna and/or a circuit.

3. A mobile station device configured to communicate with a base station device, the mobile station device comprising:
   receiving circuitry configured to receive a first physical downlink control channel for the mobile station device on the first downlink component carrier, and a second physical downlink control channel for the mobile station device on the second downlink component carrier, wherein
   each of a first block of groups in a subframe and a second block of groups in the subframe is cyclically-shifted by the base station device,
   each group in the first block of groups includes four or less symbols of the first physical downlink control channel,
   each group in the second block of groups includes four or less symbols of the second physical downlink control channel.

4. The mobile station device according to claim 3, wherein the receiving circuitry includes an antenna and/or a circuit.

5. A transmission method used for a base station device that is configured to communicate with a mobile station device, the transmission method comprising:
   transmitting a first physical downlink control channel for the mobile station device on the first downlink component carrier, and a second physical downlink control channel for the mobile station device on the second downlink component carrier, and
   cyclically-shifting each of a first block of groups in a subframe and a second block of groups in the subframe, wherein
   each group in the first block of groups includes four or less symbols of the first physical downlink control channel,
   each group in the second block of groups includes four or less symbols of the second physical downlink control channel.

6. A reception method used for a mobile station device, the mobile station device comprising:
   receiving a first physical downlink control channel for the mobile station device on the first downlink component carrier, and a second physical downlink control channel for the mobile station device on the second downlink component carrier, wherein
   each of a first block of groups in a subframe and a second block of groups in the subframe is cyclically-shifted by the base station device,
   each group in the first block of groups includes four or less symbols of the first physical downlink control channel,
   each group in the second block of groups includes four or less symbols of the second physical downlink control channel.

* * * * *